Sept. 30, 1947.   J. W. FRENCH   2,428,212
APPARATUS FOR AVERAGING DATA SUCH AS RANGE FINDER DATA
Filed Dec. 1, 1944   5 Sheets-Sheet 1
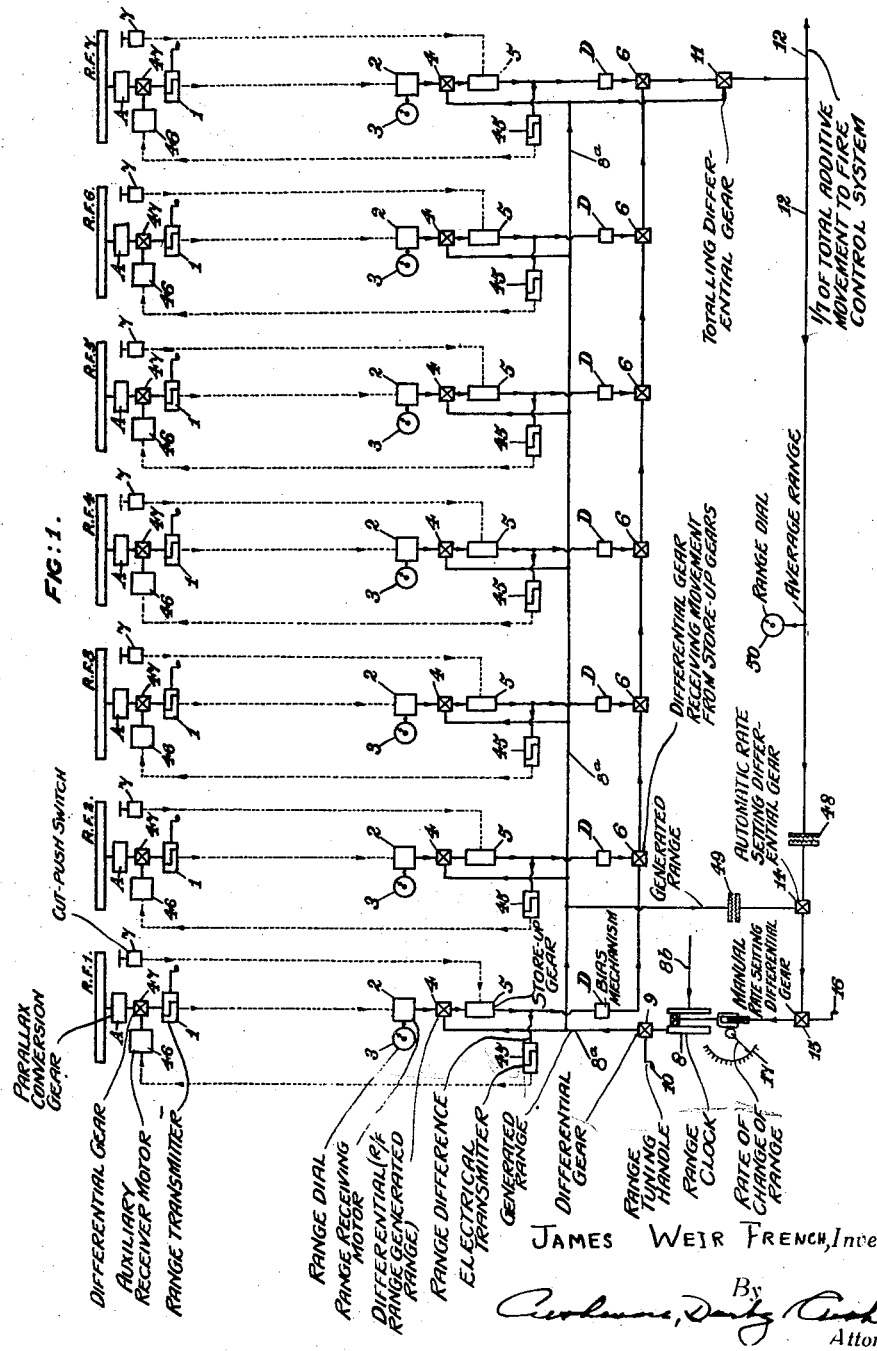

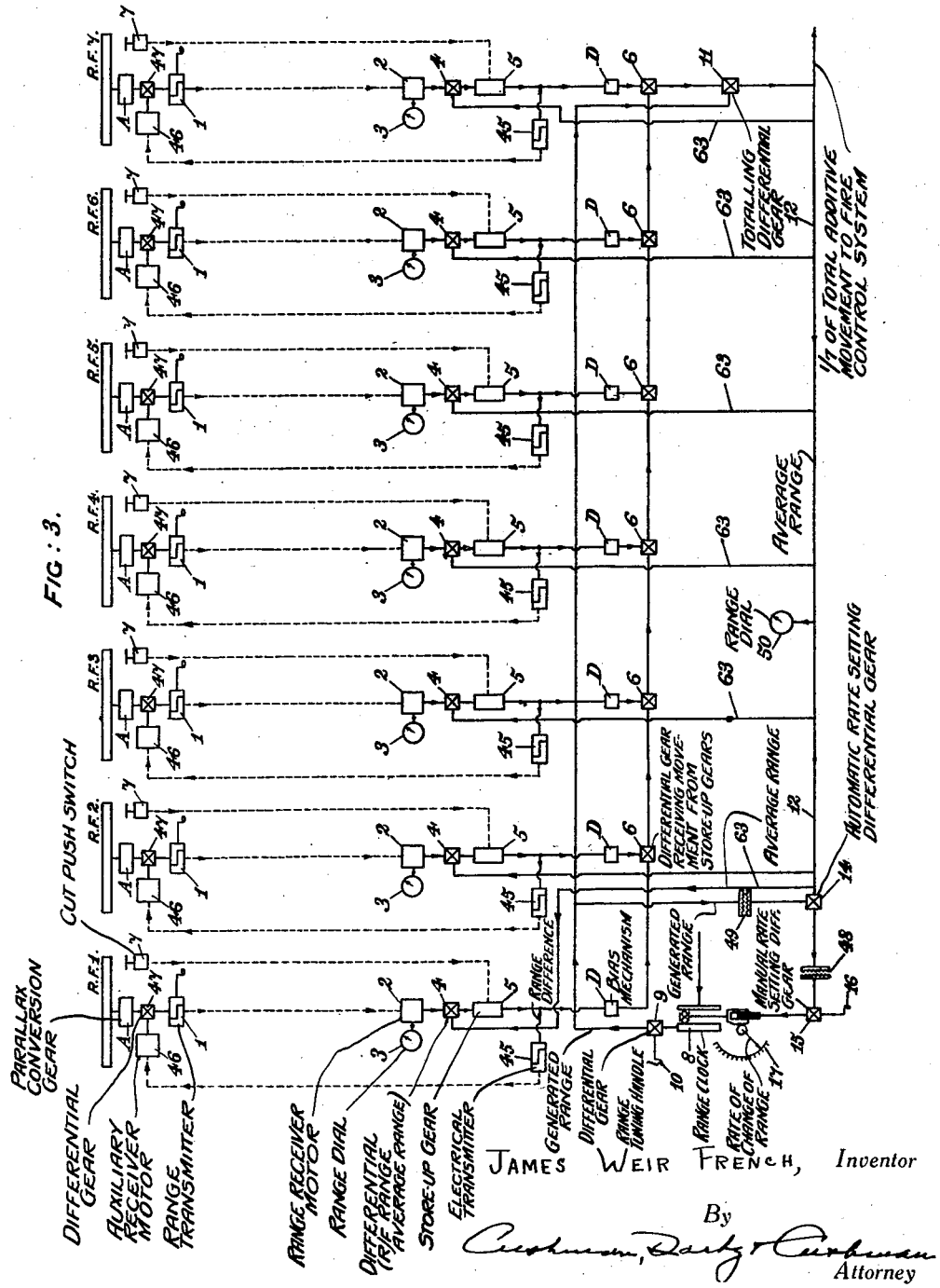

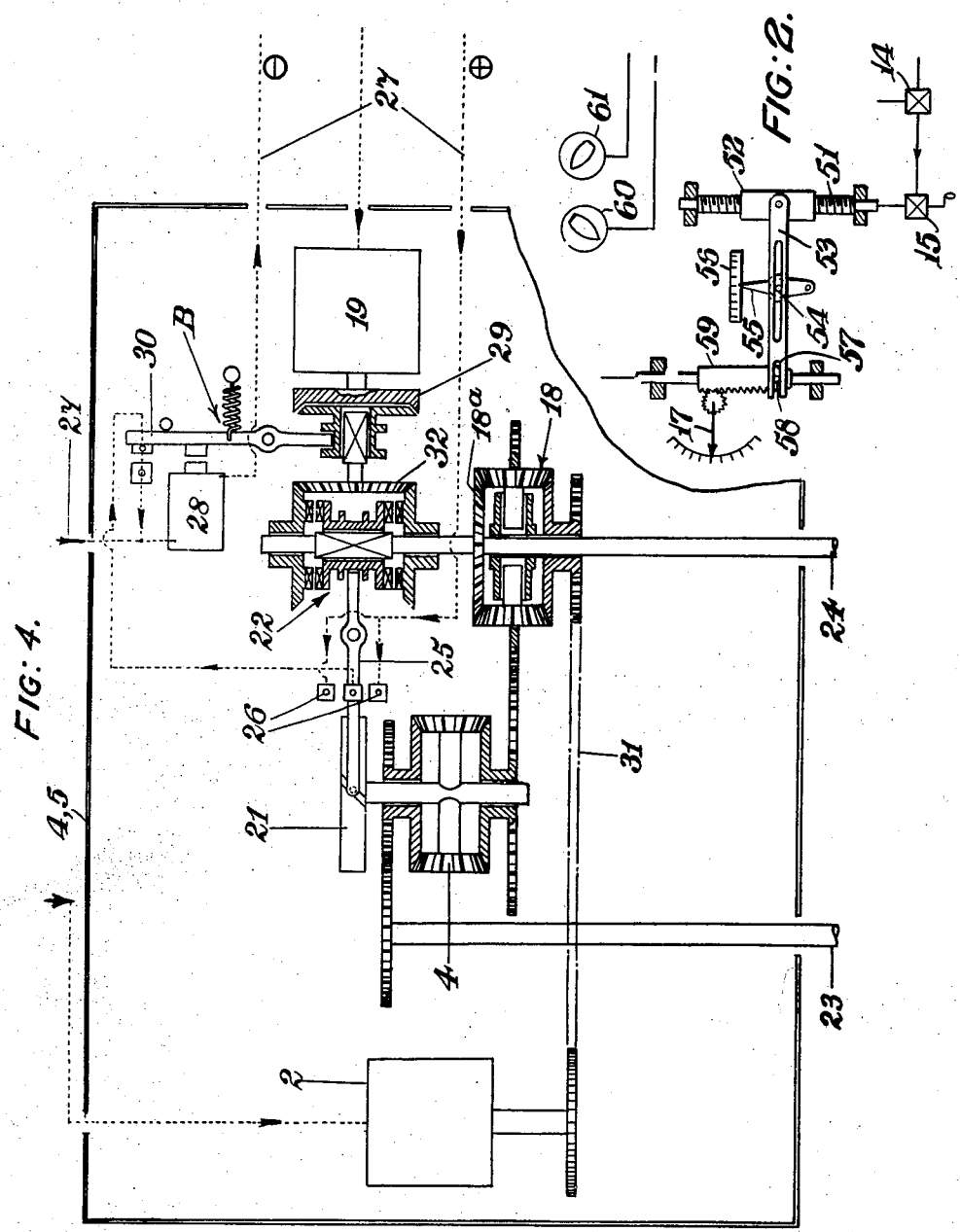

Sept. 30, 1947.  J. W. FRENCH  2,428,212
APPARATUS FOR AVERAGING DATA SUCH AS RANGE FINDER DATA
Filed Dec. 1, 1944  5 Sheets-Sheet 4
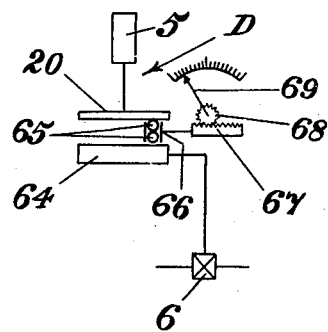
FIG: 6.
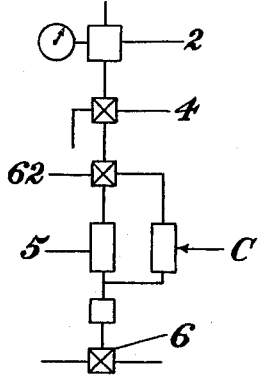
FIG: 5.
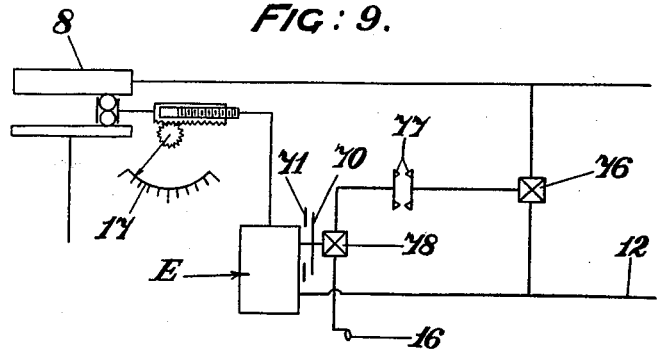
FIG: 9.
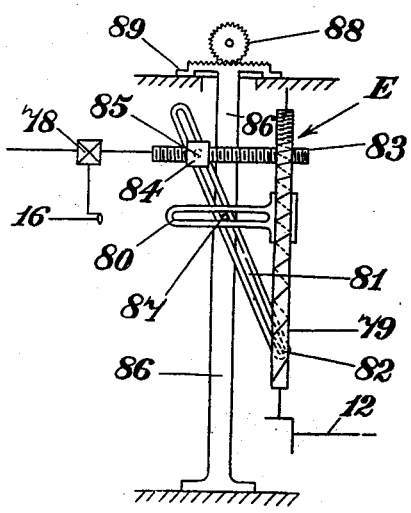
FIG: 10.
JAMES WEIR FRENCH,
Inventor
By
Attorney Sept. 30, 1947.  J. W. FRENCH  2,428,212
APPARATUS FOR AVERAGING DATA SUCH AS RANGE FINDER DATA
Filed Dec. 1, 1944  5 Sheets-Sheet 5
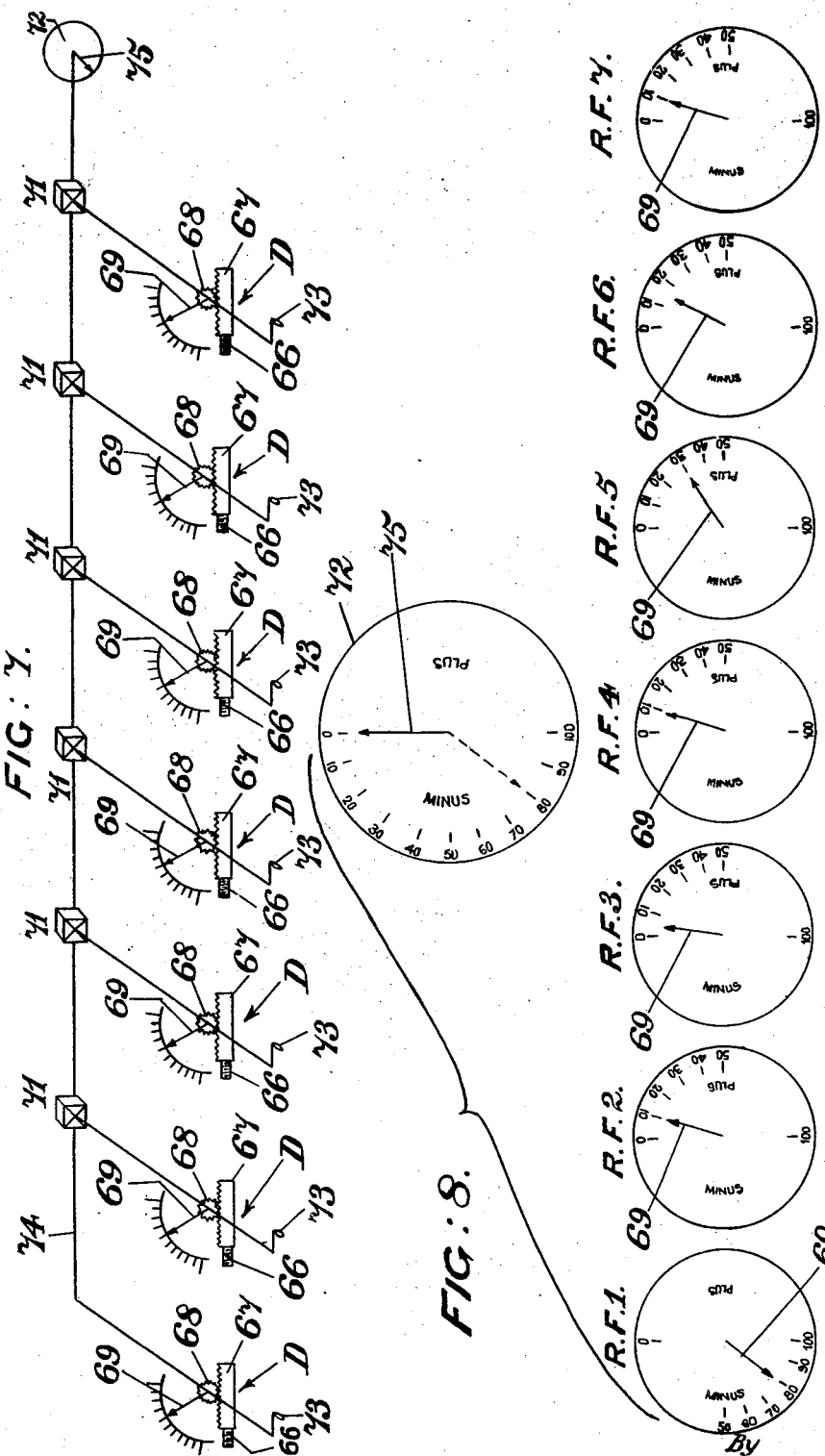
JAMES
WEIR
FRENCH
Inventor
By  Attorney Patented Sept. 30, 1947

2,428,212

UNITED STATES PATENT OFFICE 2,428,212

APPARATUS FOR AVERAGING DATA SUCH AS RANGE FINDER DATA

James Weir French, Glasgow, Scotland, assignor to Barr & Stroud, Limited, Glasgow, Scotland Application December 1, 1944, Serial No. 566,228
In Great Britain August 26, 1941

Section 1, Public Law 690, August 8, 1946.
Patent expires August 26, 1961

10 Claims. (Cl. 235—61.5)

1

This invention refers to the averaging of data communicated from two or more sources in any order and at any time. It is particularly applicable to the averaging of data for use in gunnery fire control systems whether for surface or anti-aircraft firing, the data being either parallax, ranges, horizontal ranges, functions of range, heights, angles of elevation, bearing and course, angles or kindred data.

For convenience of description, it will be assumed that the invention is concerned with the averaging of range data communicated from a group of rangefinders associated with a gunnery fire control system for surface firing. Thereafter modifications for the averaging of other data will be described.

In naval gunnery fire control systems it is common practice to mount a number of rangefinders in various positions on the ship and to transmit consecutive ranges from each particular rangefinder to a series of pens or other marking devices, each corresponding with a rangefinder, whereby range curves are traced upon a chart. As the ranges appear, an operator judges the average of the respective ranges and plots upon the chart the curve of average range. Upon the chart there will then appear the automatically traced range curves corresponding with the several rangefinders together with the mean or average curve determined by judging from the rangefinder curves and plotted by hand.

An object of the present invention is to provide means for obtaining data for plotting the mean average curve of range or similarly observed data. For reference or other purposes the ranges from the several rangefinders may, if desired, be traced automatically upon the chart or upon a separate chart or separate record strip.

According to this invention, apparatus is provided for averaging range data in which apparatus an average range difference value is derived from the differences between the average range determined by the apparatus and the respective ranges determined by the individual rangefinders, or between range as generated by a range clock or similar device and the respective ranges determined by the individual rangefinders.

To this average range difference value the average range is added.

In carrying the invention into practice, there is associated with each rangefinder of the group, a store-up gear whereby motion in accordance with the data transmitted from the rangefinder, and differentiated with clock range or average range as above explained, is stored up for subsequent release, together with means whereby the rangetaker, when satisfied with the correctness of the rangesetting, can release the store-up gear and communicate the stored-up range difference motion to the averaging elements of the apparatus where it is combined with the motion released from the store-up gears of the other rangefinders of the group to give, after suitable division, the average range difference values.

The range clock or equivalent device, capable of being set by hand or automatically in respect of rate of change of range serves to keep the average range automatically up to date.

Means, hereinafter referred to as bias gear, may be provided, whereby in the case of each rangefinder of the group its contribution to the data from which the average range is derived can be modified in accordance with its estimated or known importance or reliability, and the arrangement may be such that in the event of one or more rangefinders of the group being nonexistent or inoperative, the corresponding elements of the averaging apparatus will continue to contribute in accordance with the average ranges as determined by the apparatus. The apparatus may also comprise means whereby rates of change of range determined by appropriate elements may be applied to the adjustment of the range clock or otherwise employed in the apparatus, or indicated or plotted on charts, or transmitted to other apparatus, and further means may be provided for the transmission of average range or other data as determined by the apparatus for application to the gunnery fire control system, or for other purposes.

The invention will now be described with reference to the accompanying drawings, in which:

Figure 1 is a diagram showing the lay-out and general features of a first example of averaging apparatus for seven rangefinders.

Figure 2 shows diagrammatically some details of construction,

Figure 3 is a diagram showing the lay-out and general features of a second example of averaging apparatus, Figure 4 is a plan view showing, partly diagrammatically, a differential and store-up unit used in the apparatus, Figure 5 shows diagrammatically further details, Figures 6, 7 and 8 show bias gears for the purpose referred to, and Figures 9 and 10 show conversion gear.

Referring to Figure 1, a series of seven rangefinders R.F.I . . . R.F.7 are shown. There is associated with each rangefinder a transmission arrangement comprising a parallax-range conversion gear A of known type, a hand operated range transmitter 1 of electrical step-by-step type, a range receiver motor 2 operated electrically from the transmitter 1, a range dial 3 operated from the receiver motor 2 and indicating range values received by the receiver motor from the transmitter, a differential gear 4 whose purpose is hereafter explained, a store-up gear 5 for storing up movement received from the differential gear 4, electrical and mechanical connections between the elements just enumerated, and a cut push switch 7 located at the rangefinder with a connection whereby depression of the cut push switch effects release of the store-up gear 5.

At the lower left hand corner of Figure 1 there is shown a range clock 8, a mechanism which can be set to run at any required rate corresponding with rate of change of range. From the clock 8 connections 8a extend to each of the seven differential gears 4. In the connection from the range clock 8 to these differential gears there is a differential gear 9 with a range-tuning handle 10.

For linking up the seven transmission arrangements just described there is a further series of six differential gears 6, arranged as shown, each to receive movement from two or more store-up gears 5. From the third element of the last of the differential gears 6, motion is transmitted to one element of a totalling differential gear 11, the second element of which is connected directly to the range clock 8 by way of 8a. The third element of the differential gear 11 transmits movement to an average range transmitting line 12 which is connected on the left with the range clock 8 by way of an automatic rate setting differential gear 14 and a manual rate setting differential gear 15 provided with a hand wheel 16. To the right, the average range transmitting line 12 extends to the fire control table. The third element of the differential gear 14 is connected to the transmission line coming from the range clock, viz. 8a, so that generated range is applied to the differential gear 14.

By hand rotation of the transmitter 1, the rangetaker communicates movement through a differential 47 and the conversion gear A to the rangefinder, which may be of the coincidence or stereoscopic or other type, and thereby sets it optically as required for the determination of the range of the target. The movement of the transmitter 1 also operates the receiver motor 2 which communicates the corresponding amount of range motion to the store-up gear 5, one example of which is described later in detail with reference to Figure 4.

When the rangetaker is satisfied with the range adjustment of the rangefinder, he presses the cut push switch 7 which unlocks the store-up gear 5 from which the amount of range motion stored up is communicated to the differential 6. It is not necessary for the operator to press the switch during the whole time the store-up gear is discharging as suitable interlocking gear is provided in the store-up gear, Figure 4.

Generated range is communicated from the clock 8 to the differential 4 from whence it passes into the store-up gear, where it is subtracted from the range communicated from the rangefinder to the store-up gear. It is, therefore, the difference between the rangefinder range and the clock generated range that is communicated from the store-up gear 5 to the differential 6.

In the use of the apparatus in the manner so far described, when the rangetaker sets his instrument for a further reading he would start from the setting corresponding with his preceding observation, whereas more properly he should start from the setting corresponding with generated or average range. It is desirable either to cancel the range difference in the rangefinder setting when the discharge of the store-up gear is completed or to re-charge the store-up gear by an amount equal to the range difference existing at the rangefinder. In the first of these arrangements the range difference communicated from the store-up gear 5 is also imparted to an electrical transmitter 45 which operates an auxiliary receiver motor 46 and thence, through the intermediary of the differential 47 and the conversion gear A, the rangefinder is re-set automatically in a reverse sense by the amount of the difference of range in question. The second arrangement is described later with reference to Figure 5.

The action of the clock 8 keeps the range settings up to date as regards the store-up gear 5 and the subsequent elements, the range increment of the clock being communicated to the differential 4 for this purpose.

For checking and lining up purposes the range dial 3 is associated with the receiver motor 2 controlled by the rangefinder transmitter 1.

The operation described applies also to the other rangefinders of the group R.F.2 to R.F.7 associated with their respective differentials 6. The movement communicated from the seven rangefinders is imparted to the differential 11 with which is associated reduction gearing whereby, since there are seven rangefinders, only $\frac{1}{7}$ of the total additive movement is communicated to the line 12 and thence to the gunnery fire control system. The gearing in question may be inserted in each rangefinder group instead of at the end of the system.

The clock 8 may be of any known type as, for example, that indicated, comprising a disc rotated at a constant speed with, above it, a roller, and between the disc and the roller, two spheres in contact. The disc is rotated by a motor shaft 8b. These spheres can be moved radially. When in the centre, the rotating disc communicates no motion to the roller. As the spheres are moved outwards radially, an increasing amount of rotation is imparted to the roller. Radial movement is effected by a screw and nut device with which is associated a pointer and scale representing rate of change of range since the distance of the spheres from the centre affords an indication of this value. Initial rate may be set by hand through the intermediary of the handle 16, the differential 15, and the screw which displaces the nut, and with it, the spheres. Motion from the roller, representing generated range, is transmitted through the differential 9 to the differentials 4 of the various rangefinder systems, and thence is applied to the store-up gears 5. As previously explained, the generated range is therefore subtracted from the rangefinder range and only the difference is transmitted from the store-up gear to the differential 6.

By the introduction of the generated range, the data is kept up to date during intervals that elapse in the application of data.

For the purpose of automatically adjusting the rate setting of the clock to correspond with the data derived from the averaging apparatus, motion is communicated from the differential 9, through the clutch 49 to the differentials 14 and 15 and thence to the clock through the screw which operates the nut associated with the spheres. This nut is also operated from the line 12 which imparts average range as determined by the apparatus, through the clutch 48, thence to the differentials 14 and 15 and the rate screw of the clock. When both clutches are closed by hand operation, generated range from the clock is transmitted through the clutch 49 to the differential 14 where it is subtracted from the average range determined by the apparatus and communicated from the line 12. If the rate setting of the clock corresponds with the rate that would have produced the determined average range, no movement will be transmitted from 14 through 15 to the rate screw and no adjustment of the clock will be occasioned. If, however, the clock generated range and the average do not correspond, the difference will be transmitted from the differential 14, and the rate setting of the clock will be correspondingly altered, until such time as a balance is again obtained and further adjustment of the clock ceases.

For initial setting of the average range, the handle 10 associated with the differential 9 is used. Both clutches 48 and 49 are set in the "open" position. Rotation of the handle 10 is then communicated to the differential 11 and the average range line 12, the amount of range being indicated upon the dial 50. Since the clutches 48 and 49 are open, movement is not communicated to the differential 14 and the clock is thereby isolated.

The conversion gears A at the rangefinders may be dispensed with, in which case, angles of parallax instead of range are applied to the averaging apparatus and, if desired, a single conversion gear is inserted at the end of the system for the purpose of converting the average parallax, finally determined by the averaging gear, into average range for transmission to the gunnery fire control system.

It may be desirable to vary the speed of response of the clock; for instance, if rate of change of range fluctuates rapidly, quick response of the clock is desirable, while if the supply of data to the system is small and erratic, a slower response is advantageous. For this purpose, the operation of the rate mechanism of the clock may be effected by means as represented in Figure 2. Motion is communicated through the differentials 14 and 15, Figure 1, to the screw 51, with a nut 52, which is coupled to one end of a lever 53, pivoted about a longitudinally adjustable pivot 54 having an index 55 associated with a scale 56, the other slotted end 57 of the lever 53 being associated with a pin 58 on a rack 59 which displaces radially the spheres of the clock 8 in Figure 1. With the rack 59 there is associated a pointer and scale 17 indicating rate of change of range. When the pivot 54 is displaced in the direction of the pivot attached to the nut 52 movement from the differential 15 to the screw 51 displaces the rack 59 to a greater extent than is the case when the pivot 54 is displaced towards the other end of its adjustment, and the response of the clock is therefore greater in the former case.

Information may be afforded to the operator that will enable him to decide when speed of response of the clock should be increased or diminished. For example, dials 60 and 61 may be provide to indicate the courses of own ship and target ship, the dials being placed where they can be read by the operator manipulating the pivot 54 shown in Figure 2. Alternatively information of various kinds may be communicated by telephone or other means.

In the arrangement, Figure 1, the generated range communicated from the clock 8, is subtracted in the differential gear 4 from the range communicated from the rangefinder. In the arrangement, Figure 3, it is the average range, determined by the apparatus, that is subtracted, instead of the generated clock range. For this purpose, movement from the line 12 is communicated through the line 63 to the differential 4 and thence to the store-up gear 5, the clock connection from the differential 9 to the differential 4 being dispensed with. In other respects the arrangements shown in Figures 1 and 3 are identical.

One construction of store-up gear unit 5 is shown in Figure 4. It comprises the receiver motor 2, the differential gear 4, a differential gear 18 hereinafter referred to as the re-centering differential gear, a motor 19, and electro-magnetic clutch operating device designated as a whole by the reference B, a store-up disc 21, a reversing clutch mechanism 22, a shaft 23 conveying to the differential 4 generated range values from the clock 8 of Figure 1 or average range values from the line 12 of Figure 3, and a range difference shaft 24 conveying range difference from the unit to the differential gear 6, Figures 1 and 3.

For operating the clutch mechanism 22, there is provided a clutch operating arm 25, associated with stationary electrical contacts 26, one on either side of a contact upon the arm 25. Electric circuit connections 27, including a magnetic coil 28, are shown in broken lines.

Between the motor 19 and the reversing clutch 22, there is provided a cone clutch 29 actuated by the electro-magnetic clutch operating device B, through the medium of a cone clutch operating arm 30.

The operation of the unit is as follows:

Rangefinder range values are transmitted from the receiver motor 2 by way of gearing 31 to the first element of the recentering differential 18, and motion is transmitted from the intermediate element of that gear to the first element of the differential 4. Motion in accordance with generated range or average range is introduced by the shaft 23 and is imparted to the second element of the differential 4, the intermediate element of which then moves in correspondence with the difference in the range values applied through the shaft 23 and through the intermediary of the motor 2. The store-up disc 21 associated with the intermediate member of the differential 4, therefore rotates in accordance with the range difference.

In the central or neutral condition, the arm 25 engages an oblique slot in the periphery of the disc 21, in which position the arm 25 tends to remain. When, however, the disc 21 rotates, the arm 25 is swung to one side or the other out of engagement with the slot, depending on the direction of rotation of the disc 21. If, for example, the rotation is such that the arm 25 is swung upwards in the diagram, the lower part of the clutch mechanism 22 will move downwards into engagement, but notwithstanding this engagement, no rotation is transmitted by the clutch till such time as the rangetaker operates the cut push 7, Figure 1. When the arm 25 swings upwards, it makes contact with one of the fixed contacts 26. Meanwhile the motor 19 is running continuously. If now the rangetaker depresses his cut push 7, current flows through the coil 28 of the electro-magnetic mechanism B. The operating arm 30 is attracted to the coil 28 and the cone clutch 29 is engaged, so that the intermediate wheel 32 of the reversing clutch mechanism 22 is rotated by the motor 19; this motion is communicated, through the lower bevel wheel of the clutch 22, and through the clutch teeth in engagement with it, to the range difference shaft 24. Meanwhile the upper wheel of the clutch 22 rotates freely and communicates no motion to the shaft 24.

The rangetaker may release the cut push switch 7, Figure 1, without interrupting the re-setting operation within the store-up gear. This result is obtained by means of a secondary electric circuit completed through the contact 26, the arm 25 and the coil 28 which remains excited so long as the arm 25 lies in any position other than the central position with its end in the oblique slot of the disc 21.

When the shaft 24 rotates, the element 18A of the recentering differential 18 is caused to rotate and this in turn causes rotation of the intermediate element 18 from which movement is imparted to the first and intermediate elements of the differential gear 4 and thence to the disc 21, whereby the rotational displacement of the disc from the neutral position previously occasioned is wiped out and the arm 25 re-centred with respect to the disc 21. In this position the circuit through the coil 28 is interrupted, the cone clutch 29 is disengaged by spring action, and the reversing clutch 22 is also disengaged so that rotation of the shaft 24 ceases. Thus, only motion corresponding to the displacement of the disc 21 from its neutral position is transmitted through the shaft 24 to the differential 6. The total amount of displacement thus transmitted can be made as large as required by increasing the amount of displacement of the slot either by an increase of the diameter of the disc, or the introduction of suitable gearing, or in other known ways.

The same sequence of movements occurs if rotation of the disc 21 is in the other direction, in which case the arm 25 makes contact with the other of the two contacts 26 and engages the upper part of the clutch 22. Movement of the shaft 24 is then in the opposite direction.

A similar auxiliary store-up gear may be included, as in Figure 5, in substitution for the elements 45, 46, and 47 of Figures 1 and 3 for the purpose of automatically re-setting the store-up gear 5 into correspondence with the range difference setting of the rangefinder on the completion of the discharge of the store-up gear. In Figure 5, an auxiliary differential gear 62 is interposed between the differential gear 4 and the store-up gear 5. The auxiliary store-up gear C of Figure 5 is connected on its input side to the output side of the store-up gear 5, and on its output side to the auxiliary differential gear and thence to the input side of the store-up gear 5. When the cut push switch 7, Figure 1, is actuated and the store-up gear 5 comes into operation, the motion communicated to the differential gear 6 is also communicated to the input side of and stored in the store-up gear C. When transmission of motion from the store-up gear 5 is finished, the auxiliary store-up gear C is simultaneously automatically released. The movement stored up in it is then re-applied through the differential 62 to the input side of the store-up gear 5, thus giving it an initial setting to cancel out the difference between rangefinder range and generated or average range existing at the rangefinder, whereby the same re-setting effect at the rangefinder as by means of the mechanisms 45, 46 and 47 of Figures 1 and 3 is attained.

In the arrangements described, the rangetaker might operate the range handle during the time of discharge of the store-up gear 5, and thereby alter the applied range difference value. As this value is comparatively small and is applied in the course of a second or two, the probability of an error arising from such action is unlikely.

Figure 6 is a diagram showing bias mechanism for association with each rangefinder as indicated at D in Figures 1 and 3 between the store-up gear 5 and the differential 6. It comprises a rotatable disc 20 driven from the store-up gear 5, a rotatable roller 64 with its axis parallel to the plane of the disc 63 and radial to its centre, balls 65 in a carrier 66 resting one upon the other and in contact respectively with the disc and roller, a rack 67 forming part of the carrier 66, and a pinion wheel 68 engaged with the rack and associated with a pointer 69 which indicates the degree of bias upon an adjacent scale. A head, not shown in the diagram, on the axis of the pinion 68 is provided for the setting of the pointer 69 to the desired bias. By operation of the head, the rack is displaced and with it the balls 65 in a radial direction relatively to the disc 64, whereby the gear ratio between the disc 64 and the roller 65 can be varied and the transmission of motion to the differential gear correspondingly modified. In this particular arrangement, the contribution of any rangefinder can be varied from the maximum to zero. The bias in question is applied to any particular rangefinder quite independently of the other rangefinders of the group.

If preferred, the alternative arrangements shown in Figures 7 and 8 may be used. Whereas in the previous arrangement, Figure 6, bias is applied to a rangefinder quite independently of the bias setting of the other rangefinders, in another arrangement, Figures 7 and 8, the total change over all the rangefinders of the group is zero. If, for example, the proportional contribution of one rangefinder is reduced, the importance of the contributions of one or all of the remaining rangefinders is increased to compensate the reduction that has been made in the other rangefinder or rangefinders of the group. As shown in Figures 7 and 8, D represents the variable gear ratio elements indicated in Figure 6, and 71 is a differential gear which, together with the corresponding differential of the other rangefinders, communicates the motion to a balancing dial 72. By means of a handle 73 the operator can set the index 69 to any desired indication on a dial.

The motion imparted to 69 is communicated to the differential 71 and thence through the connection 74 and the series of differentials 71 to the dial 72 at the end of the line, which dial is provided with a pointer 75. The rotation of the handle 73, thereof, operates simultaneously the pointers 69 and 75.

Suppose, for example, one rangefinder in the group, say R. F. 1, Figure 1, is judged to be unreliable to the extent of 80%, the handle 73, Figure 7, corresponding with the first rangefinder would be rotated until the pointer 69 on the first rangefinder dial, Figure 8, is opposite the indication —80. This value —80 would then be distributed on the plus side of the various dials of the remaining rangefinders of the group according to the importance of the several instruments, the setting being effected by the handles 73. The second rangefinder might be set to 10, the third to 5, the fourth to 10, the fifth to 30, the sixth to 15, and the seventh to 10, the total being plus 80, corresponding to the minus 80 indicated on the first dial.

When the first rangefinder gear is set to minus 80, the pointer on the dial 72 would indicate minus 80. The plus settings of the remaining dials would thereafter bring the pointer 75 back to the zero position, thus affording an indication of the desired balance.

In general, when the rangefinder and the final average shaft 12 transmit a uniform scale, say a scale of ranges, then, since the rate of change of range for one particular set of conditions will be constant, no conversion gear need be associated with either the automatic or hand control of the clock 8, Figures 1 and 3. When the rangefinder and the fixed average shaft 12 transmit movement on the same scale, no conversion gear need be associated with the automatic control of the clock but since for any particular set of conditions, the rate of change of range may not be constant, conversion gear may be associated with the hand control of the clock. An example of a conversion gear suitable for this purpose is indicated in the diagram Figure 9 and in the arrangement of mechanism, Figure 10. In Figure 9, a balancing differential 76 is connected on the one side to the range clock 8 and on the other side to the average range transmission line 12. Its intermediate element is connected through a clutch 77 to a differential gear 78 interposed between a conversion gear E and the clutch 77. The affect of this balancing differential gear 76 when the clutch 77 is engaged, is to make setting of the clock 8 automatic. When the clutch 77 is disengaged, automatic rate setting has no influence on the clock 8, in which case the rate may be controlled by the handle 16.

Figure 10 shows in detail the construction of a conversion gear E that may be used for this purpose, in which the mechanism comprises a variable lead screw 79, the lead of which is made in accordance with the desired function necessary for the control of rate of change of range, a slot arm 80 engaged with the thread of the screw 79 so as to move along the screw 79 on rotation of the latter, a slotted lever 81 pivoted on a fixed point 82, a constant pitch screw shaft 83 operated from the hand wheel 16 through the intermediary of the differential 78, a nut 84 operating upon the screw 83 and having a pin 85 which engages with the slot of the lever 81, a sliding element 86 movable at right angles to the axis of the screw 79 and having a pin 87 which engages with the slot of the arm 80 and of the lever 81, and a pinion wheel 88 engaged with a rack 89 integral with the slide 86. Rotational movement of the pinion wheel 88 is imparted to the clock whereby it is set automatically for rate of change of range at any moment.

It will be seen that both movements of the arm 80 along the screw 79 and of the nut 84 along the shaft 83 affect the angularity of the lever 81 and consequently produce transverse displacement of the slide 86 together with the rack 89 and thus produce corresponding rotation of the pinion 88. The variable pitch screw is cut to suit the particular function that is being dealt with, its pitch being so calculated that the combined displacements of the pointer resulting from rotation of the screws 83 and 79 so adjust that the rate of change of range is correct at all parts of the scale and these rates may be indicated in terms of function of the range upon the scale 17.

The mechanism, Figure 10, may be arranged to suit any type of data such as heights derived from parallax range, values of angles of elevation, by a suitable cutting of the variable pitch screw 79 and by the introduction of a suitable conversion element in association with the rangefinder.

I claim:

1. Apparatus for averaging rangefinder data supplied from a plurality of independent sources, the apparatus comprising a range clock which can be set to run at a constant speed corresponding with known or estimated rate of change of range, a totalling differential gear, a connection for the transmission of the clock motion to one element of the totalling differential gear, a group of elements associated with each source, each group including a transmitter which is operated at the source to transmit observed readings, a corresponding receiver connected to the transmitter and which moves in accordance with the transmission therefrom, a group differential gear for each receiver one element of which is connected to the receiver for operation thereby, a store-up mechanism connected to the second element of the group differential gear, a transmission connection from the range clock to the intermediate element of each group differential gear, the store-up mechanism thus determining any difference between the values of the observed range from the receiver and the range obtained from the clock and storing up such difference, and a cut-push switch connected to each of said store-up mechanisms and operable by the operator at the source to release selectively the corresponding store-up mechanism at any time independently of the release of the other store-up mechanisms, these groups of parts being connected together by a main transmission line containing a number of intermediate differential gears, one less than the number of groups, arranged in series in the main transmission line and connected to the output sides of the store-up mechanisms, by means of which intermediate differential gears the output motions of the store-up mechanisms are combined and the aggregate motion applied to the second element of the totalling differential gear, the third element of which gives averaged data, the totalling differential gear including division gearing which has the effect of dividing said aggregate motion by the number of sources.

2. Apparatus for averaging rangefinder data supplied from a plurality of independent sources, the apparatus comprising a range clock which can be set to run at a constant speed corresponding with known or estimated rate of change of range, a totalling differential gear, a connection for the transmission of the clock motion to one element of the totalling differential gear, a group of elements associated with each source, each group including a transmitter which is operated at the source to transmit observed readings, a corresponding receiver connected to the transmitter and which moves in accordance with the transmission therefrom, a group differential gear for each receiver one element of which is connected to the receiver for operation thereby, a store-up mechanism connected to the second element of the group differential gear, and a cut-push switch connected to each of said store-up mechanisms and, operable by the operator at the source to release selectively the corresponding store-up mechanism at any time independently of the release of the other store-up mechanisms, these groups of parts being connected together by a main transmission line containing a number of intermediate differential gears, one less than the number of groups, arranged in series in the main transmission line and connected to the output sides of the store-up mechanisms, by means of which intermediate differential gears the output motions of the store-up mechanisms are combined and the aggregate motion applied to the second element of the totalling differential gear, an average range line connected to the third element of the totalling differential gear, and connections from said average range line to the intermediate element of each of the group differential gears, the store-up mechanism thus determining any difference between the values of the observed range obtained from the clock and storing up such difference, the totalling differential gear including division gearing which has the effect of dividing said aggregate motion by the number of sources.

3. Apparatus for averaging rangefinder data supplied from a plurality of independent sources, the apparatus comprising a range clock which can be set to run at a constant speed corresponding with known or estimated rate of change of range, a totalling differential gear, a connection for the transmission of the clock motion to one element of the totalling differential gear, a group of elements associated with each source, each group including a transmitter which is operated at the source to transmit observed readings, a corresponding receiver connected to the transmitter and which moves in accordance with the transmission therefrom, a group differential gear for each receiver, one element of which is connected to the corresponding receiver for operation thereby, a store-up mechanism connected to the second element of the group differential gear, a transmission connection from the range clock to the intermediate element of each group differential gear, the store-up mechanism thus determining any difference between the values of the observed range from the receiver and the range obtained from the clock and storing up such difference, and a cut-push switch connected to each of said store-up mechanisms and operable by the operator at the source to release selectively the corresponding store-up mechanism at any time independently of the release of the other store-up mechanisms, these groups of parts being connected together by a main transmission line containing a number of intermediate differential gears, one less than the number of groups, arranged in series in the main transmission line and connected to the output sides of the store-up mechanisms, by means of which intermediate differential gears the output motions of the store-up mechanisms are combined and the aggregate motion applied to the second element of the totalling differential gear, the third element of which gives averaged data, the totalling differential gear including division gearing which has the effect of dividing said aggregate motion, by the number of sources, there being also a connection through a hand-operated clutch from the average data line to the regulating mechanism of the range clock, a differential gear in said connection a connection from the output side of the range clock to said differential gear, and a hand-operated clutch in said last-mentioned connection so that when the said two clutches are closed motion proportional to the difference between clock output and average data is applied as a corrective to the clock.

4. Apparatus for averaging rangefinder data supplied from a plurality of independent sources, the apparatus comprising a range clock which can be set to run at a constant speed corresponding with known or estimated rate of change of range, a totalling differential gear, a connection for the transmission of the clock motion to one element of the totalling differential gear, and a group of elements associated with each source, each group including a transmitter which is operated at the source to transmit observed readings, a corresponding receiver connected to the transmitter and which moves in accordance with the transmission therefrom, a group differential gear for each receiver one element of which is connected to the receiver for operation thereby, a store-up mechanism connected to the second element of the group differential gear, and a cut-push switch, connected to each of said store-up mechanisms and, operable by the operator at the source to release selectively the corresponding store-up mechanism at any time independently of the release of the other store-up mechanisms, these groups of parts being connected together by a main transmission line containing a number of intermediate differential gears, one less than the number of groups, arranged in series in the main transmission line and connected to the output sides of the store-up mechanisms, by means of which intermediate differential gears the output motions of the store-up mechanisms are combined and the aggregate motion applied to the second element of the totalling differential gear, an average range line connected to the third element of the totalling differential gear, and connections from said average range line to the intermediate element of each of the group differential gears, the store-up mechanism thus determining any difference between the values of the observed range from the receiver and the range obtained from the clock and storing up such difference, the totalling differential gear including division gearing which has the effect of dividing said aggregate motion by the number of sources, there being also a connection through a hand-operated clutch from the average data line to the regulating mechanism of the range clock, a differential gear in said connection, a connection from the output side of the range clock to said differential gear, and a hand-operated clutch in said last-mentioned connection so that when the said two clutches are closed motion proportional to the difference between clock output data and average data is applied as a corrective to the clock.

5. Averaging apparatus according to claim 3, having a further clock-setting differential gear in the connection from the average data line to the clock-regulating mechanism, and a setting handle connected to one element of said setting differential gear, for the hand-setting of said regulating mechanism.

6. Averaging apparatus according to claim 4, having a further clock-setting differential gear in the connection from the average data line to the clock-regulating mechanism, and a setting handle connected to one element of said setting differential gear, for the hand-setting of said regulating mechanism.

7. Apparatus for averaging rangefinder data supplied from a plurality of independent sources, the apparatus comprising a range clock which can be set to run at a constant speed corresponding with known or estimated rate of change of range, a totalling differential gear, a connection for the transmission of the clock motion to one element of the totalling differential gear, a group of elements associated with each source, each group including a transmitter which is operated at the source to transmit observed readings, a corresponding receiver connected to the transmitter and which moves in accordance with the transmission therefrom, a group differential gear for each receiver one element of which is connected to the receiver for operation thereby, a store-up mechanism connected to the second element of the group differential gear, a transmission connection from the range clock to the intermediate element of each group differential gear, the store-up mechanism thus determining any difference between the values of the observed range from the receiver and the range obtained from the clock and storing up such difference, and a cut-push switch connected to each of said store-up mechanisms and operable by the operator at the source to release selectively the corresponding store-up mechanism at any time independently of the release of the other store-up mechanisms, these groups of parts being connected together by a main transmission line containing a number of intermediate differential gears, one less than the number of groups, arranged in series in the main transmission line and connected to the output sides of the store-up mechanisms, by means of which intermediate differential gears the output motions of the store-up mechanisms are combined and the aggregate motion applied to the second element of the totalling differential gear the third element of which gives averaged data, the totalling differential gear, including division gearing which has the effect of dividing said aggregate motion by the number of sources, each group aforesaid also comprising an auxiliary transmitter operated by the output motion of the store-up mechanism, an auxiliary receiver at the source, to which motion is transmitted from the auxiliary transmitter, and a re-setting differential gear between the main transmitter and the source and to the third element of which the auxiliary receiver is connected.

8. Apparatus for averaging rangefinder data supplied from a plurality of independent sources, the apparatus comprising a range clock which can be set to run at a constant speed corresponding with known or estimated rate of change of range, a totalling differential gear, a connection for the transmission of the clock motion to one element of the totalling differential gear, and a group of elements associated with each source, each group including a transmitter which is operated at the source to transmit observed readings, a corresponding receiver connected to the transmitter and which moves in accordance with the transmission therefrom, a group differential gear for each receiver one element of which is connected to the receiver for operation thereby, a store-up mechanism connected to the second element of the group differential gear, and a cut-push switch connected to each of said store-up mechanisms and operable by the operator at the source to release selectively the corresponding store-up mechanism at any time independently of the release of the other store-up mechanisms, these groups of parts being connected together by a main transmission line containing a number of intermediate differential gears, one less than the number of groups, arranged in series in the main transmission line and connected to the output sides of the store-up mechanisms, by means of which intermediate differential gears the output motions of the store-up mechanisms are combined and the aggregate motion applied to the second element of the totalling differential gear, an average range line connected to the third element of the totalling differential gear, and connections from said average range line to the intermediate element of each of the group differential gears, the store-up mechanism thus determining any difference between the values of the observed range from the receiver and the range obtained from the clock and storing up such differences, each group aforesaid also comprising an auxiliary transmitter operated by the output motion of the store-up mechanism, an auxiliary receiver at the source, to which motion is transmitted from the auxiliary transmitter, and a re-setting differential gear between the main transmitter and the source and to the third element of which the auxiliary receiver is connected.

9. Apparatus for averaging rangefinder data supplied from a plurality of independent sources, the apparatus comprising a range clock which can be set to run at a constant speed corresponding with known or estimated rate of change of range, a totalling differential gear, a connection for the transmission of the clock motion to one element of the totalling differential gear, a group of elements associated with each source, each group including a transmitter which is operated at the source to transmit observed readings, a corresponding receiver connected to the transmitter and which moves in accordance with the transmission therefrom, a group differential gear for each receiver, one element of which is connected to the receiver for operation thereby, a store-up mechanism connected to the second element of the group differential gear, a transmission connection from the range clock to the intermediate element of each group differential gear, the store-up mechanism thus determining any difference between the values of the observed range from the receiver and the range obtained from the clock and storing up such difference, and a cut-push switch connected to each of said store-up mechanisms and operable by the operator at the source to release the corresponding store-up mechanism at any time independently of the release of the other store-up mechanisms, these groups of parts being connected together by a main transmission line containing a number of intermediate differential gears, one less than the number of groups, arranged in series in the main transmission line and connected to the output sides of the store-up mechanisms, by means of which intermediate differential gears the output motions of the store-up mechanisms are combined and the aggregate motion applied to the second element of the totalling differential gear, the third element of which gives averaged data, the totalling differential gear including division gearing which has the effect of dividing said aggregate motion by the number of sources, there being in the connection between the output side of each store-up mechanism and the corresponding intermediate differential gear a bias gear capable of being set by hand.

10. Apparatus for averaging rangefinder data supplied from a plurality of independent sources, the apparatus comprising a range clock which can be set to run at a constant speed corresponding with known or estimated rate of change of range, a totalling differential gear, a connection for the transmission of the clock motion to one element of the totalling differential gear, a group of elements associated with each source, each group including a transmitter which is operated at the source to transmit observed readings, a corresponding receiver connected to the transmitter and which moves in accordance with the transmission therefrom, a group differential gear for each receiver, one element of which is connected to the receiver for operation thereby, a store-up mechanism connected to the second element of the group differential gear, and a cut-push switch connected to each of said store-up mechanisms and, operable by the operator at the source to release selectively the corresponding store-up mechanism at any time independently of the release of the other store-up mechanisms, these groups of parts being connected together by a main transmission line containing a number of intermediate differential gears, one less than the number of groups, arranged in series in the main transmission line and connected to the output sides of the store-up mechanisms, by means of which intermediate differential gears the output motions of the store-up mechanisms are combined and the aggregate motion applied to the second element of the totalling differential gear, an average range line connected to the third element of the totalling differential gear, and connections from said average range line to the intermediate element of each of the group differential gears, the store-up mechanism thus determining any difference between the values of the observed range from the receiver and the range obtained from the clock and storing up such difference, the totalling differential gear including division gearing which has the effect of dividing said aggregate motion by the number of sources, there being in the connection between the output side of each store-up mechanism and the corresponding intermediate differential gear a bias gear capable of being set by hand.

JAMES WEIR FRENCH.

REFERENCES CITED

The following references are of record in the file of this patent:

UNITED STATES PATENTS

| Number | Name | Date |
|---|---|---|
| 1,540,151 | Walker | June 2, 1925 |
| 1,572,520 | Fagerholm | Feb. 9, 1926 |
| 1,891,397 | Watson | Dec. 20, 1932 |
| 2,206,875 | Chafee et al. | July 9, 1940 |
| 2,271,752 | Wickham | Feb. 3, 1942 |